United States Patent
Hutchinson et al.

(10) Patent No.: US 7,509,381 B1
(45) Date of Patent: Mar. 24, 2009

(54) ADAPTIVE EMAIL IN-BASKET ORDERING

(75) Inventors: Gordon D. Hutchinson, Eastleigh (GB); Joseph R. Winchester, Hursley (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/106,763

(22) Filed: Apr. 21, 2008

(51) Int. Cl.
*G06F 15/16* (2006.01)

(52) U.S. Cl. .................. 709/206; 709/204; 709/205; 709/207; 370/260; 715/752; 715/753

(58) Field of Classification Search ................. 709/204, 709/205, 206, 207; 707/1, 7, 102; 370/260; 712/1; 379/93.01; 715/752, 753
See application file for complete search history.

(56) References Cited

U.S. PATENT DOCUMENTS

| | | | |
|---|---|---|---|
| 5,377,354 | A | 12/1994 | Scannell et al. |
| 6,408,277 | B1 | 6/2002 | Nelken |
| 6,496,949 | B1 * | 12/2002 | Kanevsky et al. ............ 714/47 |
| 6,842,775 | B1 | 1/2005 | Chastain et al. |
| 7,051,277 | B2 | 5/2006 | Kephart et al. |
| 7,099,855 | B1 | 8/2006 | Nelken et al. |
| 7,206,814 | B2 | 4/2007 | Kirsch |
| 7,266,535 | B1 | 9/2007 | Nelken et al. |
| 7,305,402 | B2 | 12/2007 | Hind et al. |
| 7,328,244 | B1 | 2/2008 | Kelley |
| 7,444,384 | B2 * | 10/2008 | Horvitz ....................... 709/207 |
| 2002/0107926 | A1 * | 8/2002 | Lee ............................ 709/206 |
| 2003/0187937 | A1 | 10/2003 | Yao et al. |
| 2003/0195937 | A1 | 10/2003 | Kircher, Jr. et al. |
| 2004/0143636 | A1 | 7/2004 | Horvitz et al. |
| 2004/0148330 | A1 * | 7/2004 | Alspector et al. ........... 709/200 |
| 2005/0165824 | A1 * | 7/2005 | Farnham et al. ............. 707/102 |
| 2006/0031328 | A1 * | 2/2006 | Malik .......................... 709/206 |
| 2006/0080267 | A1 | 4/2006 | Nelken |
| 2006/0195533 | A1 * | 8/2006 | Isozaki et al. ............... 709/206 |
| 2006/0195534 | A1 * | 8/2006 | Isozaki et al. ............... 709/206 |
| 2007/0005413 | A1 | 1/2007 | Hennings et al. |
| 2007/0203991 | A1 | 8/2007 | Fisher et al. |
| 2008/0126951 | A1 * | 5/2008 | Sood et al. .................. 715/752 |

FOREIGN PATENT DOCUMENTS

JP 2004070664 A * 3/2004

OTHER PUBLICATIONS

Richard B. Segal, et al., "Incremental Learning in SwiftFile," pp. 1-8, IBM Thomas J. Watson Research Center, Yorktown Heights, New York.
Richard B. Segal, et al., "MailCat: An Intelligent Assistant for Organizing E-Mail," pp. 1-8, IBM Thomas J. Watson Research Center, Yorktown Heights, New York.
"SwiftFile for Notes," pp. 1-2, IBM Research, http://www.research.ibm.com/swiftfile.

* cited by examiner

*Primary Examiner*—Thu Ha T Nguyen
(74) *Attorney, Agent, or Firm*—Suiter Swantz pc llo

(57) ABSTRACT

A method of adaptive email in-basket ordering which applies weightings to various e-mail attributes in order to sort the in-box. A plurality of unopened emails is presented. An order in which at least one email is opened is determined. At least one attribute is determined for the at least one email. A weight is generated by comparing the value of the at least one attribute with a value of at least one corresponding attribute of at least one unopened email. The weight is applied to the value of the at least one attribute. A pair-wise ordering is determined according to weighted attribute values of a first unopened email and a second unopened email. Unopened emails are sorted according to the pair-wise ordering.

1 Claim, 1 Drawing Sheet

ADAPTIVE EMAIL IN-BASKET ORDERING

TECHNICAL FIELD

The present disclosure generally relates to the field of electronic mail, and more particularly to a method for sorting electronic mail.

BACKGROUND

For many people, sorting their electronic mail (email) is a major part of their work and home tasks. This is particularly problematic when one goes on holiday or goes to a customer site for a day or two as one is faced with a very long list of emails and one has to prioritize their processing. Rules that help with putting received emails into known folders (or deleting them) are well known: For example, If the sender is X—move to folder Y, if my spam filter thinks it may be spam—move to junk mailbox, etc. Most such rules are created by the user.

People tend to open email in a particular order: spouse first, then boss, then colleagues, then friends, then work tasks, then local management news, then company news, then unrecognized, then delete the junk. However, doing this easily when the in-basket is large is more difficult as one has to make repeated scans through the in-basket to pick out the most important emails still not handled. If one leaves messages in the in-box long term and does not necessarily open 100% of emails, this scrolling through a long list makes 'missing' an email or responding slowly more likely.

SUMMARY

The disclosure is directed to a method of sorting email messages. An electronic mail program reviews a set of factors in incoming emails and weighted values of those factors. The set of factors may include, but are not limited to, any priority set by the sender, sender, senders organization, number of recipients, recency of sending, recency of mail sent to sender, conversation chain, and/or recipient type (i.e whether the recipient was addressed in a To field of an email, a CC field of the email, or a Bcc field of the email), and the like.

The user picked ordering of such factor-value pairs is observed and a pair-wise ordering between the opened emails and those that were observed but 'passed over' is determined. The consistency of the ordering of any factor-value pair within the set of all observed factor-value pair orderings can be used to measure a success rate of a predictor of two emails being opened in a particular order. Factors with a lot of consistent ordering may be seen to be dominant factors to sort by as they are good predictors.

Email messages (emails) may be sorted by more than one factor at a time. For example, the fact that an email is from a user's wife may make it more important to the user than another email even if the email was sent to more people. However, in an email from a user's manager, the fact that the email was sent {"To":the user} as a single person may make the email more important than an email from the user's manager sent to a single {"CC":me} and both may be more important than emails the user's manager has sent to a distribution list or 12 people. An email from a user's manager to just me the user be more important than an email the user's wife sends to 40 people.

The exact abstract problem of observing a population of ordered sets where the members of the sets have a number of attributes and determining from this statistical data the best sorting criteria (based on the correlation of attributes to the orders observed) to predict the subsequent ordering of any presented, unordered set—is likely to be a well known problem in statistics/math.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying FIGURE in which.

DETAILED DESCRIPTION

Figure 1:
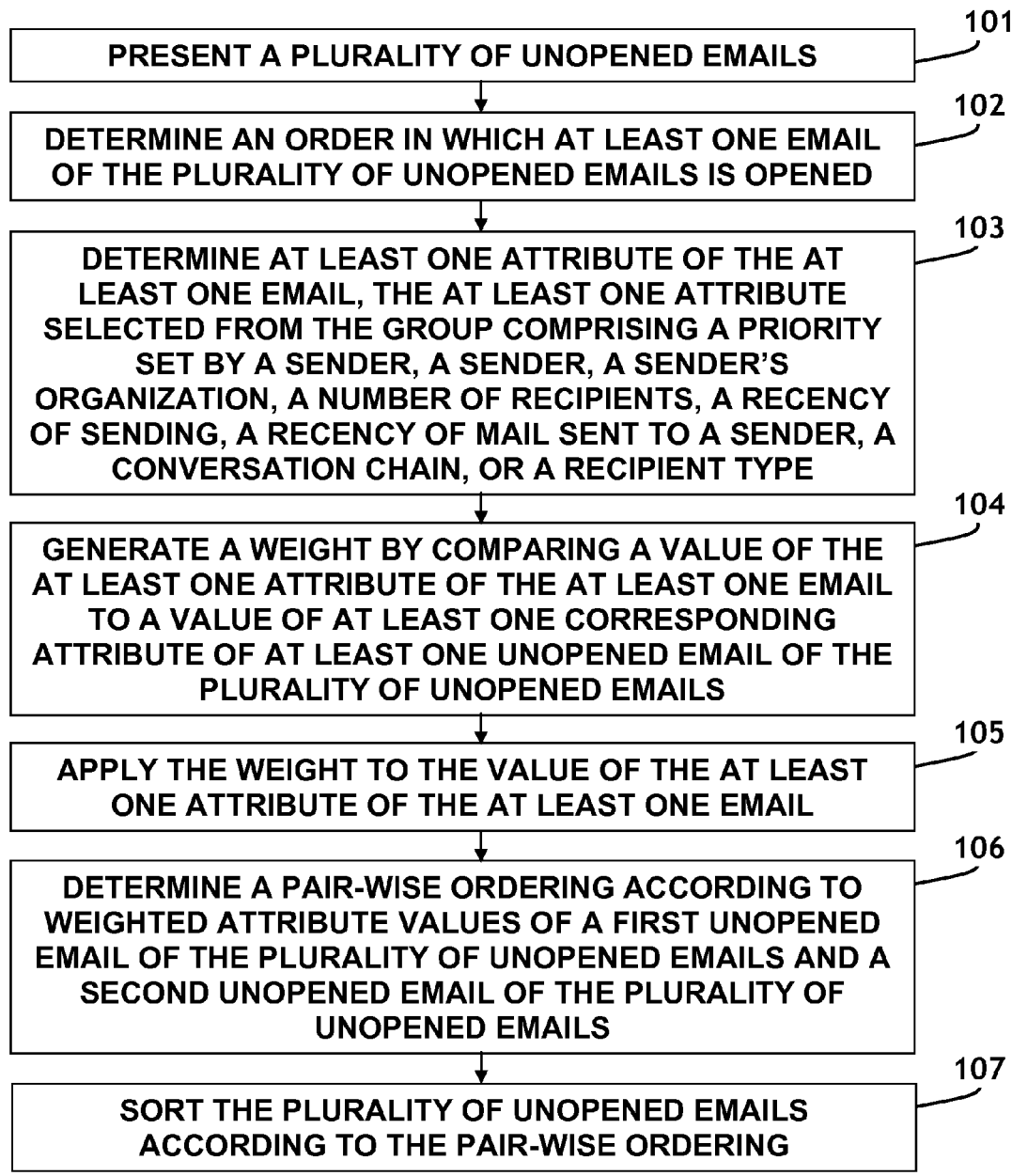
FIG. 1 is a flow diagram illustrating a method for adaptive email ordering, in accordance with an embodiment of the present disclosure.

Reference will now be made in detail to the subject matter disclosed, which is illustrated in the accompanying drawings.

FIG. 1 illustrates a method 100 for adaptive email ordering, in accordance with an embodiment of the present disclosure. In step 101, present a plurality of unopened emails. In step 102, determine an order in which at least one email of the plurality of unopened emails is opened. In step 103, determine at least one attribute of the at least one email, the at least one attribute selected from the group comprising a priority set by a sender, a sender, a sender's organization, a number of recipients, a recency of sending, a recency of mail sent to a sender, a conversation chain, or a recipient type. In step 104, generate a weight by comparing a value of the at least one attribute of the at least one email to a value of at least one corresponding attribute of at least one unopened email of the plurality of unopened emails. In step 105, apply the weight to the value of the at least one attribute of the at least one email. In step 106, determine a pair-wise ordering according to weighted attribute values of a first unopened email of the plurality of unopened emails and a second unopened email of the plurality of unopened emails. In step 107, sort the plurality of unopened emails according to the pair-wise ordering.

It is contemplated that the order a user clicks on unopened emails may be observed, relative to the set of currently unopened ones seen by the user, and the patterns that govern the order of this prioritization may be learned. Subsequently the unopened emails may be sorted by a predicted priority order. This order may be close to the desired order that the user wishes to open the emails and he/she can then work down the list more efficiently—more important emails opened and dealt with sooner, less scrolling about, less 'passes' through the set of unopened ones.

Existing email clients allow rules to be attached to the client that can sort e-mail into different folders based on sender or string matching. The present method presents dynamic sort that observes the actions of the user to learn a future sorting order that can be done automatically. This method may operate without any human configuration at all or any user visible notion of rules. The present method compares values in an opened email with the equivalent values in emails that are visible to the user but 'passed over' in order that the opened email is opened before them. The rules are learned by example (and thus they can be arbitrarily complex—more complex than can be easily expressed manually) and the user does not need to specify them.

The disclosure reviews a set of factors in incoming emails and the values of those factors. The set of factors may include, but are not limited to, any priority set by the sender, sender, senders organization, number of recipients, recency of sending, recency of mail sent to sender, conversation chain, recipient type (i.e whether the recipient was addressed in a To field of an email, a CC field of the email, or a Bcc field of the email), etc.

The user picked ordering of such factor-value pairs is observed and a pair-wise ordering between the opened emails and those that were observed but 'passed over' is determined. The consistency of the ordering of any factor-value pair within the set of all observed factor-value pair orderings can be used to measure how good a predictor of two emails being opened in a particular order. Factors with a lot of consistent ordering can be seen to be 'dominant' factors to sort by as they are good predictors.

The emails may be sorted by more than one factor at a time. For example, the fact an email is from a user's wife may make it more important to the user than another email even if the email was sent to more people. However, in an email from a user's manager manager the fact that the email was sent {"To":the user} as a single person may make the email more important than an email from the user's manager sent to a single {"CC":me} and both may be more important than emails the user's manager has sent to a distribution list or 12 people. An email from a user's manager to just me the user be more important than an email the user's wife sends to 40 people.

The exact abstract problem of observing a population of ordered sets where the members of the sets have a number of attributes and determining from this statistical data the best sorting criteria (based on the correlation of attributes to the orders observed) to predict the subsequent ordering of any presented, unordered set—is likely to be a well known problem in statistics/maths.

A method of adaptive electronic mail (email) ordering unopened emails and presents unopened emails to a user. The order in which a user opens (including, but not limited to, by selecting and/or clicking on) the unopened emails relative to a set of currently unopened emails is observed and patterns are learned that govern how the user is prioritizing the presented unopened emails. Then, the unopened emails are sorted based on the pattern learned from how the user has prioritized the unopened emails. As the user continues to open unopened emails, the order in which the user opens the unopened emails relative to a set of currently unopened emails is observed and updated patterns are learned. The sorting of the unopened emails is updated based on the updated pattern. Thus, the sorting is constantly adapted based on the actual ordering that unopened emails are opened.

A plurality of unopened emails is presented. An order in which at least one email of the plurality of unopened emails is opened is determined. At least one attribute of the at least one email is determined. The at least one attribute may include, but is not limited to, a priority set by the sender, sender, a sender's organization, a number of recipients, a recency of sending, a recency of mail sent to sender, a conversation chain, and/or a recipient type (i.e. whether the receipient was addressed in a To field of an email, a CC of the email, or a Bcc field of the email). A weight is generated by comparing a value of the at least one attribute of the at least one email to a value of at least one corresponding attribute of at least one unopened email of the plurality of unopened emails. The weight is applied to the value of the at least one attribute of the at least one email. A pair-wise ordering is determined according to weighted attribute values of a first unopened email of the plurality of unopened emails and a second unopened email of the plurality of unopened emails. The plurality of unopened emails is sorted according to the pair-wise ordering.

For example, when a user indicated that they wish the unopened emails sorted in their usual preference order the unopened emails may be sorted utilizing a bubble sort of the unopened emails with the following definition of the less than "<" operation (which can be read as "comes nearer the start") used to compare two emails. When two emails, A and B, are compared, let F1 be factor 1 and AF1 be the value of factor 1 for email A.

A score for each factor is calculated as follows: if the number of occurrences of both AF1 and BF1 in a set of unopened emails is above some threshold then AF1<BF1 if there has been more openings observed in the order AF1;BF1 than BF1 (#1). Otherwise, AF1<BF1 if emails with the factor AF1 have a higher average 'percentile order of opening' than emails with factor BF1 (#2). A 'percentile order of opening' is defined to be: 100−(((observer opening order for emails with this factor)/(no of unopened items presented))*100). If either AF1 or BF1 have not been observed then that factor does not contribute to the calculation. It can easily be seen that the <operator can have a "strength" where AF1 is always before might be −100, always after is +0 and 50/50 is just that 50. So (#1 above is: 100*(count AF1 first/(count of observed AF1 in same in-basket as BF1)) and #2 above is 50−((percentile AF1−percentile BF1)/2)). The result is a vector of orderings this is neutral at 50: e.g. (10, 54, 23, 12) if the, possible weighted, average is <50 then A<B and vice versa.

For the weightings, each factor is given an equal initial weighting of 1.0. The above vector is calculated for 'real' openings observed by the user—where an individual factors score is 'wrong' (predicts the wrong ordering) its weighting is decreased by a small amount. The small amount is perhaps relative to what % of times this factor is wrong so that after a large number of observations the factor's weighting will not be changed much as long as it is working generally but not recently due to a few recent 'failures'. Factors that a consistently unhelpful will become less and less important in the calculation, leaving those that are significant in place. When below a certain threshold weighting factors are no longer stored or calculated. The weighting should converge on the numbers that are appropriate.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A method of adaptive email ordering comprising:
presenting a plurality of unopened emails;
determining an order in which at least one email from the plurality of unopened emails is opened;
determining at least one attribute of the at least one email, the at least one attribute selected from the group comprising a priority set by a sender, a sender, a sender's organization, a number of recipients, a recency of sending, a recency of mail sent to a sender, a conversation chain, or a recipient type;
generating a weight by comparing a value of the at least one attribute of the at least one email to a value of at least one corresponding attribute of at least one unopened email of the plurality of unopened emails; applying the weight to the value of the at least one attribute of the at least one email;
determining a pair-wise ordering according to weighted attribute values of a first unopened email of the plurality of unopened emails and a second unopened email of the plurality of unopened emails, the pair-wise ordering being based on a number of occurrences of both a first weighted attribute value for the first unopened email and a second weighted attribute value for the second unopened email above a threshold number, the pair-wise ordering providing priority to unopened emails containing said first weighted attribute value when there has been more openings observed of emails containing the first weighted attribute value in relation to openings observed of emails containing the second weighted attribute value; and
sorting the plurality of unopened emails according to the pair-wise ordering, the plurality of unopened emails being automatically sorted without human intervention based on the pair-wise ordering.

* * * * *

UNITED STATES PATENT AND TRADEMARK OFFICE
CERTIFICATE OF CORRECTION

PATENT NO.        : 7,509,381 B1                                    Page 1 of 1
APPLICATION NO.   : 12/106763
DATED             : March 24, 2009
INVENTOR(S)       : Gordon Hutchison and Joe Winchester It is certified that error appears in the above-identified patent and that said Letters Patent is hereby corrected as shown below:

Title Page, Item (12) and Item (75), Delete "Hutchinson" and insert -- Hutchison --.

Signed and Sealed this

Fourteenth Day of December, 2010

David J. Kappos
*Director of the United States Patent and Trademark Office*